Patented Oct. 6, 1925.

1,556,325

UNITED STATES PATENT OFFICE.

OSKAR FRITZ AMANDUS EMIL GRUMPELT, OF HAMBURG, GERMANY.

METHOD FOR CUTTING METALS BY THE AID OF AN ELECTRIC CURRENT FED TO A ROTATING CUTTING DISK.

No Drawing. Application filed October 24, 1924. Serial No. 745,717.

*To all whom it may concern:*

Be it known that I, OSKAR FRITZ AMANDUS EMIL GRUMPELT, a citizen of Germany, residing at Hamburg, Germany, have invented certain new and useful Improvements in a Method for Cutting Metals by the Aid of an Electric Current Fed to a Rotating Cutting Disk, of which the following is a specification.

The present invention deals with a novel practical method of cutting metals, rapidly and at low cost.

It was formerly proposed to cut metals by the aid of an electric current combined with a rotating disk, used as a cutting disk and assisted in operation by heating small parts of the blank in front of the cutter by the electric current, and that the parts thus softened or melted were then to be removed by the cutting implement. Trials of this method did not fulfill the expectations, and proved that the method could not be carried out practically. The fact is, that at that time the proposal was based on the idea, that the electric current should have a high tension and a low strength. The trials have proved, that this idea was erroneous. While in the former proposal it was intended, it is true, to have the cutting disk to run quickly, yet the speed, which at that time was considered high, is by no means sufficient for successfully carrying out the method. Not until the cutting disk is given such a high speed as is now given to the new high-speed or rapid-friction-saws, can the object be attained.

According to the present invention the rotating cutting disk is given a speed as is usual with high speed saws, and the electric current used has a high amperage and a comparatively low voltage. In the present method a disk having a diameter of approximately 900 mm. and rotating at about 3000 revolutions per minute is used, and the electric current has a voltage preferably not greater than 10 volts and an amperage at least ten times as great. By these means an effect is gained which is essentially different from the old proposal. While according to the old method the aim was directed towards softening the metal surface and to allow the rotative implement to positively cut into the so softened metal, according to the present method, by using a current of high amperage and low voltage such a powerful electric arc is created, that before the cutting edge of the disk positively contacts with the metal a lineal combustion takes place, and the disk, then only flings away the products of combustion or oxides. This combustion by the electric arc is moreover accelerated by the high circumferential velocity of the disk, since the latter carries along with it a continuous current of fresh air, and thus produces a decided stream of oxygen. It may be of advantage to assist this operation by positively directing in front of the disk, an additional jet of pure oxygen or of substances which when heated develop oxygen.

The operation of the cutting disk thus is essentially different from that of the former proposal, since it is not really the disk itself that does the cutting, but it is the electric arc which has this effect. The disk, not contacting with the metal, as was the case with the former methods, is not heated to a high temperature, and results in the advantage, that the disk cannot cling to the metal, and then when coming to a standstill be welded together with it, as was formerly unavoidable.

In carrying out the new method the disk remains comparatively cool, and though it might be of advantage to make use of a water cooling, this is not an absolute necessity, because due to the high speed of the disk it is in constant contact with fresh air, and therefore is cooled by such stream of air. The danger of being welded together with the blank to be cut is out of question, since it does not come into direct contact with it, and also owing to the great speed and the small increase of temperature.

It has been proven that this method is much superior to all heretofore known cutting methods with regard to the reduction of costs as well as to the saving of time.

Thus, by way of example, cutting an I-beam of 400 mm. by means of autogenous fusing consumed 2½ minutes of time, while according to the applicant's method the same beam is cut through in only 18 seconds. In a plate of thickness of 18 mm. a cut of 2½ m. was made by the new method in one minute, while by the aid of known high speed saws the same cut of 2½ m. in an 18 mm. thick plate, requires, 3¾ minutes. Furthermore, even with sawing machines of the newest construction such a long cut has up to the present been impossible. The utmost cut that was possible with these machines was about a length of 400 mm. The time which is required by the known autogenous fusion method is a multiple of that which is required with the new method.

As has been pointed out above only low tension currents at a high amperage are used. If a current in the municipal electric works of 250 volts and 2 amperes is to be used, it will be necessary to use a transformer or converter which reduces the voltage to 10 volts and increases the amperage to 500. However, a still higher strength of current and a lower voltage can be used.

To give an idea of the reduction of costs it may be explained, that in working with the new method one kilowatt of electric energy is used during one hour, while according to the autogenous fusion methods on the same conditions, an expenditure of oxygen was necessary the costs of which were proved to be many times that mentioned in connection with the new method.

What is claimed is:—

1. A method for cutting metals by means of a rotating disk and an electric current comprising rotating the disk at a peripheral speed in excess of 120 m. per second and using an electric current not exceeding 10 volts, and having an amperage at least 10 times as great as the voltage, whereby a lineal combustion of the metal results.

2. A method for cutting metals by means of a rotating disk and an electric current as stated in claim 1, and in which a jet of oxygen is directed towards the cutting place.

OSKAR FRITZ AMANDUS EMIL GRUMPELT.